Oct. 23, 1934.  N. E. MORRISON  1,978,275

METHOD OF AND APPARATUS FOR FINISHING RUBBER ROLLS

Filed Nov. 20, 1933

Noah E. Morrison
INVENTOR

BY *Victor J. Evans &Co.*
ATTORNEYS

Patented Oct. 23, 1934

1,978,275

UNITED STATES PATENT OFFICE 1,978,275

METHOD OF AND APPARATUS FOR FINISHING RUBBER ROLLS

Noah E. Morrison, Lititz, Pa.

Application November 20, 1933, Serial No. 698,900

3 Claims. (Cl. 18—5)

The invention relates to a method of and apparatus for finishing rubber rolls and more especially printing machine rolls.

The primary aim of the present invention is in the subjecting of a rubber roll to heat and then working the surface of the roll when being subjected to heat so as to smooth such surface and thus eliminating irregularities therein, such as rust areas or roughened or irregular spots or places present at the surface of such roll, the method being novel and intended more especially for the resurfacing or refinishing of printing machine rolls.

Another object of the invention is the provision of a machine of the character specified, wherein a printing machine roll can be held and a heated mangle or other tool placed in confronting relation to the surface of such roll so that the heat present therein will be transmitted to the roll surface for the softening thereof to a degree to permit the refinishing of the surface of said roll to relieve it of unevenness and irregularity as may be present therein at its surface.

A further object of the invention is the provision of a machine of the character specified, wherein the same is of novel construction and will automatically operate in conjunction with the tool for the treating of a printing machine or other roll for the resurfacing of such roll without necessitating the rebuilding thereof.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
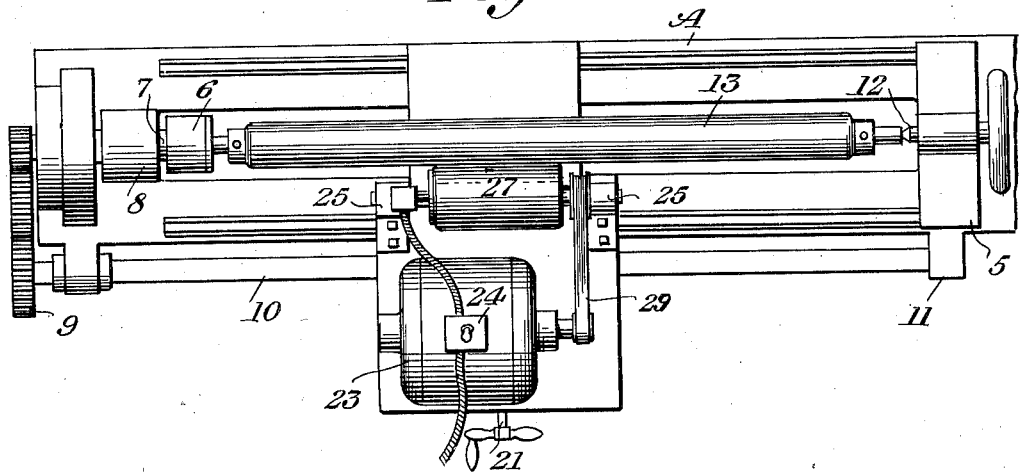
Figure 1 is a top plan view of a machine constructed in accordance with the invention.
Figure 2:
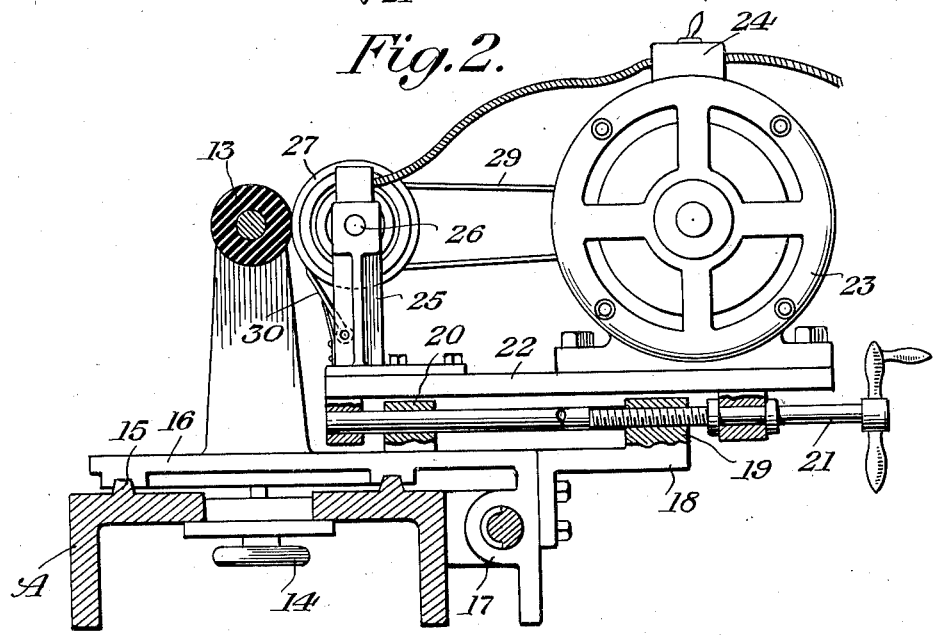
Figure 2 is an enlarged vertical transverse sectional view through the machine.
Figure 3:
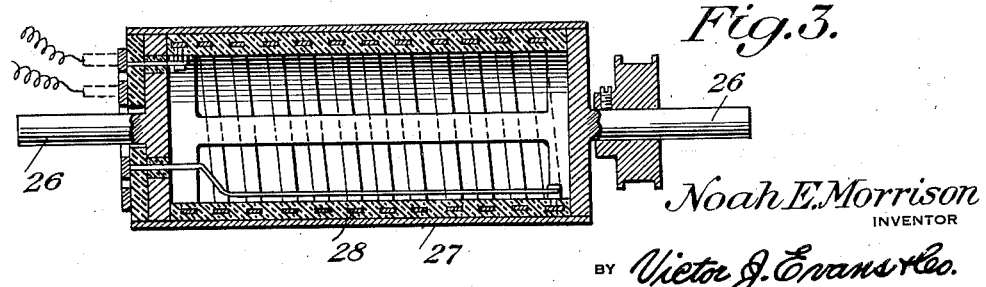
Figure 3 is an enlarged longitudinal sectional view through the heated mangle, exampling one style of tool employed in the method of surfacing or resurfacing a printing machine roll.

Referring to the drawing in detail, A designates generally a lathe bed having slidably supported thereon a work holder 5 coacting with a chuck 6 having its spindle 7 journaled in a stationary bearing 8 and this spindle, through a train of gearing 9, cooperates with a feed screw 10 suitably journaled at 11, this bearing being a part of the lathe bed A. The work holder 5 carries a hand adjustable centering spindle 12, the latter with the chuck supporting a rubber roll 13, in this instance being a printing machine roll. The chuck 6 when turned by the spindle 7 rotates said roll 13 in the working of the machine. It is preferable to have this spindle 7 driven from a motor, preferably of the electric type and not shown. The work holder 5, under suitable adjustment, will permit varying lengths of rolls to be held in the machine and such adjustment can be had by way of a clamp 14.

Upon the bed A of the lathe is a track 15 with which is slidably fitted a carriage 16, this having the connection 17 with the feed screw 10 so that such platform will be moved upon the track 15 longitudinally of the bed A of the lathe. The carriage 16 carries a bracket 18, the same and said platform being formed with bearings 19 and 20, respectively, for the mounting of a hand operable adjusting screw 21 carried by a platform 22 upon which is mounted an electric motor 23, the starting and stopping thereof being controlled by a hand switch 24. Upon the platform 22 is a pair of uprights 25 which constitute bearings for the axle 26 of a mangle 27 containing within an electric heating element 28, this being controlled by the switch 24. The mangle 27 is located for contact with the surface of the rubber roll 13 and when heated by the element 28 the heat will be transferred from said mangle to the surface portion of the roll for the conditioning of said surface, whereby it may be smoothed under the action of the mangle for the surfacing or resurfacing of such roll. The motor has connection with the axle 26 of the mangle 27 by the belt 29, so that said mangle will be driven from the motor 23.

Suitably mounted in the uprights 25 is a doctor blade 30 which operates upon the mangle 27 to clean it in the operation of the machine.

It will be obvious that by adjustment of the adjusting screw 21 the pressure of the mangle 27 upon the rubber roll 13 can be varied according to needs, and by the train of gearing 9 and the feed screw 10 the platform 22 will be automatically moved at the proper speed longitudinally of the bed A of the lathe so that the mangle 27 can operate upon the roll 13 throughout its length.

The method in the treatment of the roll 13 involves the subjecting of the surface of said roll to heat of the proper degree so that the surface of the roll will become pliable to the desired extent and by the contact of the mangle 27 with this surface and the travel of such mangle and its rotation will regularly surface the said roll to render it smooth, the machine being desirable more especially for the resurfacing of printing machine rolls.

It is, of course, obvious that the application of the heat and the manner of ironing the surface of the roll may be effected other than by the use of the heated mangle and this is contemplated within the scope of the invention.

What is claimed is:

1. A machine of the character described comprising a lathe bed, a work holder adjustable on said bed, a chuck rotatably carried by the bed, a feed screw journaled longitudinally of the bed at one side thereof, driven connections between the chuck and said feed screw, a carriage operated upon by said feed screw, an adjustable platform on said carriage, a heating mangle journaled upon said platform for action upon a rubber roll when supported in the chuck and work holder, and means for rotating the mangle.

2. A machine of the character described comprising a lathe bed, a work holder adjustable on said bed, a chuck rotatably carried by the bed, a feed screw journaled longitudinally of the bed at one side thereof, driven connections between the chuck and said feed screw, a carriage operated upon by said feed screw, an adjustable platform on said carriage, a heating mangle journaled upon said platform for action upon a rubber roll when supported in the chuck and work holder, means for rotating the mangle, and means for adjusting the platform to regulate the contact of the mangle with the rubber roll.

3. A method for surfacing rubber rolls consisting in mangling the surface of said roll and subjecting the surface of said roll to heat during the mangling action thereon.

NOAH E. MORRISON.